United States Patent Office 3,329,618
Patented July 4, 1967

3,329,618
DETERGENT COMPOSITIONS CONSISTING ESSENTIALLY OF β-KETOALKYL ALKYL SULFOXIDES AND WATER-SOLUBLE ALKALINE DETERGENCY BUILDER SALTS
Warren I. Lyness, Mount Healthy, and David E. O'Connor, Cincinnati, Ohio, assignors to The Procter & Gamble Company, Cincinnati, Ohio, a corporation of Ohio
No Drawing. Original application Mar. 30, 1965, Ser. No. 444,068. Divided and this application Sept. 12, 1966, Ser. No. 578,467
5 Claims. (Cl. 252—138)

ABSTRACT OF THE DISCLOSURE

Detergent compositions consisting essentially of β-ketoalkyl alkyl sulfoxides and up to 90% of water-soluble alkaline detergency builder salts.

This application is a division of copending application Ser. No. 444,068, filed Mar. 30, 1965.

This invention relates to sulfoxide derivatives containing keto groups in the beta position and to methods for synthesizing said derivatives.

Compounds containing both a sulfoxide group and a beta-keto group $$(\text{e.g., } -\overset{O}{\underset{\parallel}{C}}-CH_2-\overset{O}{\underset{\uparrow}{S}}-)$$

are very useful either as surface active agents or as intermediates in the preparation of surface active agents. Heretofore, it has been difficult, if not impossible, to prepare compounds containing both groups.

Most of the difficulties encountered in preparing a compound containing both keto and sulfoxide groups are a result of the sulfoxide group. Previously, sulfoxides have been prepared by oxidation of the corresponding sulfide, however, this oxidation method is not very desirable. This oxidation method almost inevitably produces a mixture containing some unreacted sulfides and/or some sulfone byproducts which are generally undesirable. It is difficult to separate the sulfides and sulfones from the desired sulfoxides.

It can be appreciated, therefore, that an effective method for introducing a sulfoxide group and a keto group into the same compound at predetermined sites is desirable. It can be equally appreciated that a method which permits the formation of compounds containing both keto and sulfoxide groups without the use of high temperatures, corrosive oxidizing agents and specialized equipment is very desirable.

Accordingly, it is an object of this invention to prepare compounds containing both a sulfoxide group and a keto group in the beta position (hereinafter referred to as keto sulfoxides), by methods which avoid the aforesaid defects and in which the advantages hereinbefore indicated are inherent.

It is a more specific object of this invention to provide keto sulfoxides having surface active properties.

It is a yet further object of this invention to provide detergent compositions containing keto sulfoxide detergents.

The objects of this invention can be accomplished by reacting salts of sulfinyl carbanions having the formula $$R-\overset{O}{\underset{\uparrow}{S}}-\overset{R^1}{\underset{R^2}{\overset{|}{C}}}{}^{\ominus}M^{\oplus}$$

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein the total number of carbon atoms in the sulfoxide compound does not exceed about 32, and not more than two of the hydrocarbon groups in the compound contain aryl groups, and wherein M is an alkali metal (e.g., sodium, potassium or lithium) with an acylating agent selected from the group consisting of (1) Carboxylic acid esters having the formula $$(R^4-\overset{O}{\underset{\parallel}{C}}-O-)_nR^5$$

wherein $R^4$ is a hydrocarbon group containing from 1 to 29 carbon atoms and from 0 to about 2 ester groups and $R^5$ represents the alkyl portion of the alcohol part of the ester and contains from 1 to about 20 carbon atoms and $n$ is an integer from 1 to 3 and corresponds to the number of hydroxyl groups originally present on the alcohol, (2) Acyl chlorides having the formula $$R^4(-\overset{O}{\underset{\parallel}{C}}-Cl)_n$$

wherein $R^4$ has the definition hereinbefore given and $n$ is an integer from 1 to 3, (3) Acid anhydride of monocarboxylic acids having the formula $$\begin{array}{c} R^4-\overset{O}{\underset{\parallel}{C}} \\ \diagdown \\ O \\ \diagup \\ R^4-\overset{}{\underset{\parallel}{C}} \\ O \end{array}$$

wherein each $R^4$ has the definition hereinbefore given, (4) Diesters of carbonic acid $$R^5-O-\overset{O}{\underset{\parallel}{C}}-O-R^5$$

wherein $R^5$ has the definition hereinbefore given, (5) Succinic anhydride, and
(6) Phthalic anhydride.

The symbol used for the sulfoxide group $$(-\overset{O}{\underset{\uparrow}{S}}-)$$

is only a convenient representation of the structure for purposes of the description of the invention and is not necessarily indicative of the actual structure which is believed to involve a semi-polar bond. This symbol or even more simply (—SO—) is used hereinbefore and hereinafter to represent the sulfoxide group.

As used herein, the term "hydrocarbon groups" refers to both unsubstituted hydrocarbon groups and substituted hydrocarbon groups containing, for example, ether linkages. Preferably the substituent hydrocarbon groups (R) in the formulas above and below are alkyl chains, straight or branched, containing from 1 to about 22 carbon atoms (e.g., methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9-octadecenyl, cyclopentyl, cyclohexyl, cyclohexylmethyl, methylcyclohexyl, 2-cyclohexyldodecyl, 12-cyclohexyldodecyl, 4-dodecylcyclohexyl and propynyl). Examples of other groups include aryl groups containing 6 to 12 carbon atoms (e.g., phenyl, biphenyl and naphthyl); and alkyl aryl groups containing benzene or naphthalene groups with branched or straight alkyl chains of from 1 to about 18 carbon atoms (e.g., benzyl, 2-phenyl-dodecyl, 1-methyl-2-phenylethyl, 2-indenyl and naphthylmethyl). $R^1$ and $R^2$ are each selected from the group consisting of hydrogen and hydrocarbon groups which are the same as those examples given hereinbefore with respect to R. The presence of certain non-reactive groups in or on the substituent R, $R^1$ or $R^2$ groups is permissible. As an example of non-reactive groups, these substituent groups can contain up to about 10 ether and/or thioether linkages. Amino groups can be appended to the chain or imino

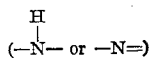

groups can form a part of the chain with open-chain and/or cyclic configuration. (R, $R^1$ and $R^2$, have the above definitions throughout the specification and claims.) Thus, R, $R^1$ or $R^2$ can represent, for example, such groups as 3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9- or 10-methoxyoctadecyl;
9- or 10-ethoxyoctadecyl;
9- or 10-methylthiooctadecyl;
2-, 3-, or 4-methoxycyclohexyl;
3- or 4-methylthiocyclohexyl;
3-cyclohexyloxydecyl;
2,5,8,11,14-pentamethyl-3,6,9,12,15-pentaoxaheneicosanyl;
2-tetrahydrofuranyl;
2-tetrahydrothiophenyl;
tetrahydropyranyl;
2-(tetrahydropyranyl)-ethyl;
2-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl; and
2-thiazolyl.

Additionally, R can represent, for example, β-N-anilinoethyl; β-N-anilinopropyl; β-N-pyridylethyl; 1-methoxy-2-indanyl; β-N-naphthylaminoethyl; 2-benzoxazolyl and 4,6-dianilino-2-sym-triazinyl.

It will be understood that more than one sulfoxide group can be present in the molecule of the sulfoxide starting compound. That is to say there can be more than one

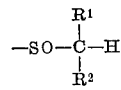

group. Preferably these additional groups are alkyl sulfinyl groups and more preferably they are methyl sulfinyl groups. However, the two sulfoxide groups should not be attached to the same carbon atom since the reactivity of the compound will then be enhanced as explained in U.S. Patent 3,124,618. Also, if there are not at least three aliphatic carbon atoms separating sulfoxide groups, then cleavage of the compound by the base may occur. Sulfoxide groups can be attached to adjacent carbon atoms on a benzene ring, however. Polymers containing multiple pendent alkyl sulfinyl groups, e.g., methyl sulfinyl groups, are desirable as sulfoxide starting compounds. The restriction on the number of carbon atoms which can be present in the molecule is, of course, different when more sulfoxide groups are present. The number of carbon atoms per sulfoxide group should not exceed 32, however.

The preferred sulfoxide starting compound is dimethyl sulfoxide,

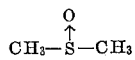

because it undergoes the aforementioned reaction with remarkable facility and is readily available. Other preferred sulfoxide starting compounds are alkyl methyl sulfoxides, R—SO—$CH_3$, wherein R contains from about 2 to about 22 carbon atoms (e.g., dodecyl methyl sulfoxide).

REACTIONS OF ACYL ESTERS

The reaction of acyl esters with the salts of sulfinyl carbanions acylates the sulfoxide and generates concomitantly an alkoxide ion. It is believed that the reaction proceeds as follows, where sodium methylsulfinylcarbanion is used as an example:

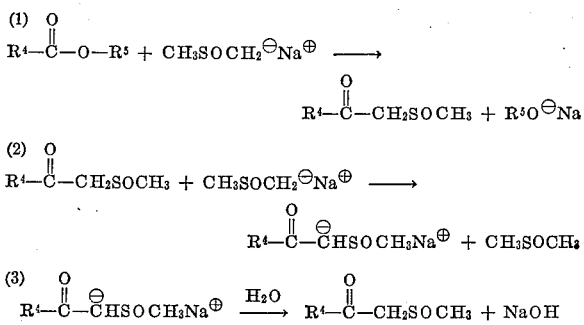

As hereinbefore mentioned, R$^4$ in the preceding equations is the hydrocarbon portion of the acyl group. R$^4$ contains from 1 to about 29 carbon atoms and can be an alkyl, aryl, alkyl aryl, or aryl alkyl, e.g., the acid portion of the ester can be acetic, stearic, benzoic, propionic, butyric, isobutyric, naphthoic, toluic, para-ethylbenzoic, phenylacetic, or cinnamic acids. R$^4$ can contain additional esterified carboxyl groups, e.g., the acid can be a dicarboxylic acid containing from 2 to about 12 carbon atoms, such as succinic or phthalic acids, which is completely esterified. R$^5$ represents the alkyl portion of the alcohol part of the ester and contains from 1 to about 20 carbon atoms, $n$ is an integer from 1 to 3 corresponding to the number of hydroxy groups present on the alcohol. That is to say that the alcohol can contain up to two additional esterified hydroxyl groups, e.g., the ester can be a triglyceride. Where there are more than one R$^4$ groups in the molecule they need not all be the same. The total number of carbon atoms in the molecule should not be more than about 60. (R$^4$ and R$^5$ have the above respective definitions throughout the specification and claims except where otherwise specifically defined.)

Instead of adding water in reaction (3) to destroy the keto-sulfinyl carbanion by adding a hydrogen atom to the carbon bearing the negative charge, a compound with an available hydrogen, such as an alcohol, can be added which will also add a hydrogen atom to keto-sulfinyl carbanions, or an alkyl halide (R$^3$CH$_2$X) can be added to alkylate the carbon between the keto and sulfoxide groups by an alkylation reaction which forms an alkali metal halide as a by-product as described in the copending application of Warren I. Lyness, David E. O'Connor and Jim S. Berry, Ser. No. 448,229, now Patent No. 3,288,860.

Examples of acyl ester reactants for use with the sulfinyl carbanions include ethyl benzoate, methyl toluate, dibutyl phthalate, dimethyl terephthalate, diethyl isophthalate, ethyl cinnamate, ethyl acetate, methyl acetate, methyl vanillate, methyl anisate, methyl salicylate, methyl anthranilate, methyl nicotinate, methyl veratrate, methyl phenylacetate, methyl propionate, methyl butyrate, methyl pivalate, isopropyl myristate, cetyl palmitate, octyl octanoate, methyl lignocerate, methyl isovalerate, ethyl laurate, methyl laurate, methyl stearate, methyl oleate, methyl linoleate, ethyl palmitate, methyl valerate, ethyl caproate, methyl caprate, methyl undecylenate, diethyl succinate, dimethyl sebacate, dimethyl azelate, diethyl adipate, and mixtures of methyl or ethyl esters prepared from fatty acids derived from natural sources such as coconut oil and tallow. Esters of polyols such as triglycerides and propylene glycol diester will undergo the same reaction; the triglycerides are preferred reactants from economic considerations. Thus, for example, methylsulfinylcarbanion reacts at the ester functions of animal or vegetable fats, such as soybean oil or lard, to produce sulfinyl acylation products. Acyl esters, as hereinbefore described, of alcohols containing from one to about three hydroxy groups, when completely esterified with acids containing from 2 to 30 carbon atoms and from one to three acid groups (all of which are esterified) and wherein said ester contains a total of from about 3 to about 60 carbon atoms are useful reactants with the sulfinyl carbanion.

REACTIONS OF ACYL CHLORIDES

The acyl chlorides react with the salts of sulfinyl carbanions as follows, where sodium methylsulfinylcarbanion is used as an example:

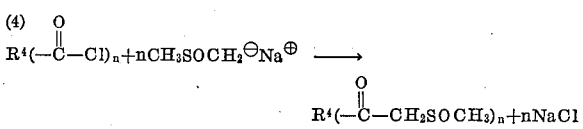

As hereinbefore stated

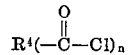

can represent acid chlorides of both mono- and di-carboxylic acids. That is to say $n$ can be either 1 or 2. Useful acid chlorides include acetyl chloride, butyryl chloride, benzoyl chloride, lauroyl chloride, stearoyl chloride and adipoyl chloride.

REACTIONS OF ACID ANHYDRIDES OF MONOCARBOXYLIC ACIDS

Acid anhydrides of monocarboxylic acids react with salts of sulfinyl carbanions as follows, wherein R$^4$ has the definition hereinbefore given and sodium methylsulfinylcarbanion is used as the example:

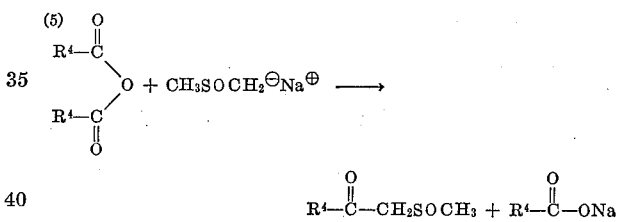

As mentioned hereinbefore R$^4$, in this particular case, does not contain another acid, acid chloride, or ester group. That is to say

is a mono acyl group. Examples of useful anhydride reactants derived from monocarboxylic acids include acetic anhydride, butyric anhydride, lauric anhydride and acetic propionic anhydride.

REACTIONS OF DIESTERS OF CARBONIC ACID

Diesters of carbonic acid will react with the salts of sulfinyl carbanions by undergoing the same reaction as the more conventional dicarboxylic acid esters hereinbefore discussed. The product of this reaction, however, is different from the product of the reactions of the more conventional dicarboxylic acid esters. The product of this reaction will be more fully discussed hereinafter. Examples of carbonate esters which are useful reactants are dimethyl carbonate, diethyl carbonate and dicetyl carbonate.

REACTIONS OF SUCCINIC AND PHTHALIC ANHYDRIDES

Succinic and phthalic anhydrides differ from the aforementioned anhydrides of monocarboxylic acids in that they contain two potential acid groups on the same molecule. Therefore, the product of the reaction of these anhydrides with the alkali salts of the sulfinyl carbanions is unique by virtue of containing a carboxylate group in addition to the groups normally formed by acylation of alkali metal salts of sulfinyl carbanions.

Dimethyl sulfoxide is an excellent solvent for the reactions of this invention and in most instances an excess of dimethyl sulfoxide is the preferred solvent. However, other non-reactive solvents or diluents can be used, especially other sulfoxide compounds. These solvents should not contain any reactive constituent either as part of the structure of the solvent or as part of impurities present in the solvent if maximum yields are desired. The use of solvents which will react with the salts of the carbanion is generally undesirable. It is recognized, however, that certain reactive compounds can be present as a solvent or as a component of a solvent mixture to yield an in situ formation and reaction of the salts of sulfinyl carbanions.

Suitable non-reactive solvents or diluents for the above reactions of salts of sulfinyl carbanions and acylating agents and for alkali metal alkanesulfenates and acylating agents as hereinafter more fully described are to be found in such classes of compounds as the aliphatic or aromatic hydrocarbons, aliphatic, aromatic or mixed aliphatic-aromatic ethers, cyclic ethers and amines. Examples of suitable non-reactive hydrocarbon solvents include hexane, petroleum ether, "Stoddard" solvent, benzene, toluene and mixed xylenes. Among the ether compounds which are suitable as solvents are diethyl ether, dibutyl ether, anisole, diphenyl ether, tetrahydrofuran, 1,2-dimethoxyethane and diethylene glycol dimethyl ether. Amine compounds which can serve as solvents for the reactions of this invention and include butylamine, N-methyl butylamine, anhydrous ethylene diamine, pyridine and morpholine. Anhydrous liquid ammonia can also be used as a solvent. Still another compound which is suitable is N,N-dimethyl formamide. Other similar non-reactive solvents or diluents can be used with substantially equivalent results.

The rate and course of the above reactions can be affected by the choice of solvent. The use of mixtures of two or more non-reactive compounds as the reaction medium is, of course, suitable and in some cases preferable to the use of a single species.

The reactions of this invention are normally carried out at slightly above room temperature (25° C.); temperatures of about 50° C. to about 70° C. are preferred.

Carbon metal bonds are unstable at elevated temperatures and at 120° C., for instance, sodium methylsulfinylcarbanion is destroyed. Therefore, elevated temperatures above the decomposition temperature of the carbanion are undesirable. Lower temperatures than room temperature are not normally desirable because the speed of the reaction is undesirably decreased. A temperature range of from about 0° C. to about 100° C. is suitable for carrying out the reactions of this invention.

2-KETOALKYL ALKYL SULFOXIDES

The new and useful compounds produced by the acylation of the salts of sulfinyl carbanions with the acylation agents hereinbefore described contain at least one sulfoxide group and at least one ketone group. As such, they are useful either as surface active agents, or as intermediates in the preparation of surface active agents or other useful compounds as hereinafter described.

For example, compounds prepared from the reaction of natural triglyceride mixtures such as coconut oil or tallow with sodium methylsulfinyl carbanion are good surfactants and are useful in detergent formulations.

The compounds of this invention have the formula

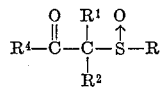

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein the total number of carbon atoms in the sulfoxide compound does not exceed about 32, and not more than two of the hydrocarbon groups in the compound contain aryl groups, and wherein $R^4$ contains from 1 to about 29 carbon atoms.

Examples of the compounds which can be formed from this reaction are:

2-ketotridecyl methyl sulfoxide
2-ketoundecyl methyl sulfoxide
2-ketononadecyl methyl sulfoxide
2-keto-10-nonadecenyl methyl sulfoxide
2-ketopentadecyl methyl sulfoxide
benzoylmethyl methyl sulfoxide
o-aminobenzoylmethyl methyl sulfoxide The first five compounds above are detergent materials. The last two compounds, which can be formed, for example, by reacting benzoyl chloride or ethyl benzoate or the amino-substituted products with sodium methylsulfinylcarbanion, are useful perfume materials.

Those 2-ketoalkyl alkyl sulfoxides which do not have detergent properties are surface active agents or are useful as intermediates in the preparation of surface active agents.

The dicarboxylic acid esters and carbonic acid esters can react to form compounds having two sulfinyl groups and having the formula

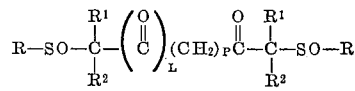

wherein L is usually 1 but can be 0 for the carbonate esters, and P is either zero (for the carbonate and oxalate esters) or an integer from one to about ten. Therefore, when both L and P are zero the ester reactants are carbonate esters; when L is one and P is zero the ester reactants are oxalate esters, and when L is one and P is an integer, the ester reactants are the esters of dicarboxylic acids such as succinic acid.

For example, the product of a reaction between dimethyl succinate and two moles of sodium methylsulfinylcarbanion is 1,6-bis(methylsulfinyl) hexane-2,5-dione, which is useful either as such or after conversion to the corresponding diol, as a cross-linking agent for cellulose and wool. When diethyl carbonate is substituted for dimethyl succinate, the product is bis(methylsulfinyl) ketone which is also a cross-linking agent for cellulose and wool.

The anhydrides of succinic and phthalic acids react as hereinbefore described to give compounds having the following generic formula

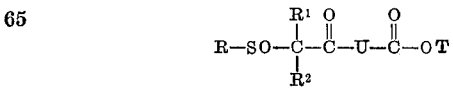

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein the total number of carbon atoms in the sulfoxide compound does not exceed about 32, and not more than two of the hydrocarbon groups in the compound contain aryl groups, wherein U is selected from the group consisting of —$C_2H_4$— and

and wherein T is selected from the group consisting of alkali metals and hydrocarbon groups containing from 1 to about 28 carbon atoms.

5-ALKYLSULFINYL-LEVULINIC ACID DERIVATIVES

The reaction of succinic anhydride with the sulfinyl-carbanions of this invention produces derivatives of levulinic acid. For example, the reaction of succinic anhydride with sodium methylsulfinylcarbanion would give the sodium salt of 5-methylsulfinyl-levulinic acid. Esters of this acid are, for example, bacteriostatic agents.

ORTHO-CARBOXYBENZOYLMETHYL ALKYL SULFOXIDES

The reaction of phthalic anhydride with the sulfinyl carbanions of this invention gives, as a product, an ortho-carboxybenzoylmethyl alkyl sulfoxide. For example, the product of a reaction of phthalic anhydride with sodium methylsulfinylcarbanion is the sodium salt of ortho-carboxybenzoylmethyl methyl sulfoxide. The methyl ester, for example, of this material is a perfume material. When the sulfinyl carbanion contains a long chain hydrophobic group, the product is a surface active agent.

SURFACE ACTIVE AGENTS AND DETERGENT COMPOSITIONS

The novel 2-ketoalkyl alkyl sulfoxides are useful per se as detergent and surface active compounds or as intermediates in the preparation of detergent and surface active compounds.

The uses to which surface active compounds can be put are numerous and well known, e.g., preparing oil-in-water emulsions, textile treatment, dyeing, flotation, preparation of rubber latex, and the like.

Desirably, but not necessarily, the 2-ketoalkyl alkyl sulfoxides are used with alkaline builder materials to form built detergent compositions, as for example, liquid, bar, flake, granular or tabletted granular compositions. Such compositions have enhanced detergent characteristics due to coaction in aqueous washing compositions between the 2-ketoalkyl alkyl sulfoxides and the alkaline builder material.

2-ketoalkyl alkyl sulfoxides which are detergents are those in which one of the R groups hereinbefore described contains from about 8 to about 20 carbon atoms and the rest of the R groups are either hydrogen atoms or short alkyl chains containing from 1 to about 3 carbon atoms. Preferred detergents are those which have the formula

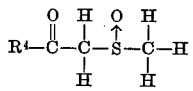

wherein $R^4$ is an alkyl group containing from about 8 to about 20 carbon atoms. These are incorporated into detergent compositions in amounts from about 0.5% to about 50% by weight of the composition.

The detergent compositions of this invention contain from about 0% to 90%, preferably from 20% to 90%, of water soluble alkaline detergency builder salts, either of the organic or inorganic types, and should provide a washing solution pH of about 9 to about 12. The ratio of builder salts to organic detergent is preferably from about 1:4 to about 20:1, preferably from about 0.7:1 to about 9:1. Examples of water soluble inorganic alkaline detergency builder salts are alkali metal carbonates, phosphates, polyphosphates, and silicates. Specific examples of such salts are sodium and potassium tripolyphosphates, carbonates, pyrophosphates, orthophosphates, and hexametaphosphates. Examples of organic alkaline detergency builder salts are (1) alkali metal amino polycarboxylates [e.g., sodium and potassium ethylenediaminetetraacetates, N-(2-hydroxyethyl)-ethylenediaminetriacetates, nitrilo triacetates, and N-(2-hydroxyethyl)-nitrilo diacetates]; (2) alkali metal salts of phytic acid (e.g., sodium and potassium phytates—see U.S. Patent 2,739,942); (3) water soluble salts of ethane-1-hydroxy-1,1-diphosphonate (e.g., the trisodium and tripotassium salts—see U.S. Patent 3,159,581); (4) water soluble salts of methylene diphosphonic acid (e.g., trisodium and tripotassium methylene diphosphonate and the other salts described in the copending application of Francis L. Diehl, Ser. No. 266,025, filed March 18, 1963 now Patent No. 3,213,030); (5) water soluble salts of substituted methylene diphosphonic acids (e.g., trisodium and tripotassium ethylidene, isopropylidene, benzylmethylidene, and halomethylidene diphosphonates and the other substituted methylene diphosphonates disclosed in the copending application of Clarence H. Roy, Ser. No. 266,055, filed March 18, 1963); (6) water soluble salts of polycarboxylate polymers and copolymers as described in the copending application of Francis L. Diehl, Ser. No. 269,359, filed April 1, 1963 (e.g., polymers of itaconic acid, aconitic acid; maleic acid; mesaconic acid; fumaric acid; methylene malonic acid; and citraconic acid and copolymers with themselves and other compatible monomers such as ethylene); and (7) mixtures thereof.

Mixtures of organic and/or inorganic builders can be used and are generally desirable. Especially preferred are the mixtures of builders disclosed in the copending application of Burton H. Gedge, Ser. No. 398,705, filed Sept. 23, 1964, e.g., ternary mixtures of sodium tripolyphosphate, sodium nitrilotriacetate, and trisodium ethane-1-hydroxy-1,1-diphosphonate.

The detergent compositions of this invention can contain any of the usual adjuvants, diluents and additives, for example, anionic, nonionic, ampholytic, cationic or zwitterionic detergents, perfumes, anti-tarnishing agents (e.g., sodium and potassium silicates and benzotriazole), anti-redeposition agents (e.g. alkali metal and ammonium salts of carboxymethyl cellulose), bacetrio-static agents, dyes or pigments (including optical brighteners), suds builders, suds depressors, and the like, without detracting from the advantageous properties of the composition. Examples of anionic detergents are sodium-coconut soap, sodium dodecylbenzene sulfonate and potassium tallow alkyl sulfate. Examples of nonionic detergents are dodecyldimethylamine oxide and the condensation product of coconut fatty alcohol with 5.5 moles of ethylene oxide. An example of a zwitterionic detergent is 3-(N,N-dimethyl-N-hexadecylammonio) - 2-hydroxypropane-1-sulfonate. An example of an ampholytic detergent is sodium-3-dodecylamino-propionate. An example of a cationic detergent is cetyltrimethylammonium bromide.

Normally the organic detergent components, the builders and the minor ingredients are incorporated into the composition prior to conversion into fiinal product form, e.g., detergent granules, flakes, etc., but they can also be added individually in the form of particles or as liquids.

The following examples are illustrative but not limiting to the practice of this invention.

*Example I*

22 g. (0.10 mole) of ethyl laurate in 50 ml. of dimethyl sulfoxide was added to 0.12 mole of methylsulfinylcarbanion (sodium salt) in 75 ml. of dimethyl sulfoxide and the mixture was stirred for two hours at 25°–30° C., at which time the reaction was essentially complete. The reaction mixture was allowed to stand overnight at room temperature and then ten ml. of water was added to the flask and then the entire mixture was poured into 200 ml. of ice water. The precipitate was filtered off and was taken up in acetone. The acetone was filtered and then evaporated to give a residue. The water-dimethyl sulfoxide solution was extracted three times with ethyl acetate which was then evaporated to a residue. The residues were combined and recrystallized twice from hexane to yield 6.7 g. of 2-ketotridecyl methyl sulfoxide (melting point: 81–82° C.).

When glyceryl trilaurate was substituted for ethyl laurate in the above reaction a 51% yield of 2-ketotridecyl methyl sulfoxide was obtained. This 2-ketotridecyl methyl sulfoxide is useful as a detergent surfactant.

In a similar reaction ethyl acetate was reacted with methylsulfinylcarbanion to give 2-ketopropyl methyl sulfoxide, which is useful as an intermediate in the preparation of detergent surfactants and other surface active agents.

When either acetic anhydride or acetyl chloride are substituted for the ethyl acetate in this example, substantially equivalent results are obtained in that the 2-ketopropyl methyl sulfoxide is produced. Substitution of lauric anhydride and lauroyl chloride for the ethyl laurate in this example gives substantially equivalent results in the formation of the 2-ketotridecyl methyl sulfoxide occurs.

When diesters such as diethyl carbonate and dimethyl succinate are reacted with the sodium salt of the methylsulfinylcarbanion, the reaction occurs at both ester groups and the products are 1,6-bis(methylsulfinyl) hexane-2,5 dione and (bis(methylsulfinyl) ketone respectively which are useful as cross-linking agents for cellulose and wool.

When either succinic anhydride or phthalic anhydride is reacted with the sodium salt of the methylsulfinylcarbanion the products are, respectively, the sodium salt of 5-methylsulfinyllevulinic acid (the esters of this acid are bacteriostatic agents) and the sodium salt of ortho carboxybenzoylmethyl methyl sulfoxide (the methyl ester of this compound is a perfume material).

When in the above example the following groups are substituted for the methyl in the sodium salt of methylsulfinylcarbanion, and/or when the following groups are substituted either wholly or in part for one and/or two hydrogen atoms on the carbanion so that the total number of carbon atoms in the resulting alkali metal sulfinyl carbanion compound is less than 32, and so that there are no more than two aromatic groups present in the molecule, substantially the same results are achieved in that the corresponding alkali metal sulfinyl carbanions react with the acylating agents to produce the corresponding keto sulfoxide compounds:

methyl;
ethyl;
n-propyl;
isopropyl;
n-butyl;
isobutyl;
n-pentyl;
isopentyl;
n-hexyl;
n-heptyl;
n-octyl;
isooctyl;
2-ethylhexyl;
diisobutyl;
n-nonyl;
tripropylene;
n-decyl;
undecyl;
n-dodecyl;
tridecyl;
n-tetradecyl;
pentadecyl;
n-hexadecyl;
n-octadecyl;
eicosyl;
docosyl;
vinyl;
propenyl;
octenyl;
10-undecenyl;
9-octadecenyl;
cyclopentyl;
cyclohexyl;
cyclohexylmethyl;
methylcyclohexyl;
2-cyclohexyldodecyl;
12-cyclohexyldodecyl;
4-dodecylcyclohexyl;
propynyl;
phenyl;
biphenyl;
naphthyl;
benzyl;
2-phenyl-dodecyl;
1-methyl-2-phenylethyl;
2-indenyl;
naphthylmethyl;
3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9- or 10-methoxyoctadecyl;
9- or 10-ethoxyoctadecyl;
9- or 10-methylthiooctadecyl;
2-, 3-, or 4-methoxycyclohexyl;
3- or 4-methylthiocyclohexyl;
3-cyclohexyloxydecyl;
2,5,8,11,14-pentamethyl-3,6,9,12,15-pentaoxaheneicosanyl;
2-tetrahydrofuranyl;
2-tetrahydrothiophenyl;
tetrahydropyranyl;
2-(tetrahydropyranyl)-ethyl;
2-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;

β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl;
2-thiazolyl;
β-N-anilinoethyl;
β-N-anilinopropyl;
β-N-pyridylethyl;
1-methoxy-2-indanyl;
β-N-naphthylaminoethyl;
2-benzoxazolyl;
4,6-dianilino-2-sym-triazinyl; and mixtures thereof.

When in the above example the corresponding potassium and lithium salts of the carbanions are substituted either wholly or in part for the sodium salts, substantially the same results are achieved in that the reaction with the acylating agents follows essentially the same path.

When in the above example the following solvents are substituted either wholly or in part for the dimethyl sulfoxide, substantially equivalent results are obtained in that the same reactions occur: benzene, 1,2-dimethoxy ethane, hexane, petroleum ether, xylenes, diphenyl ether, tetrahydrofuran, butylamine, N,N-dimethyl formamide, or diethylene glycol dimethyl ether (diglyme), "Stoddard" solvent, toluene, pyridine, diethyl ether, dibutyl ether, anisole, N-methyl butylamine, anhydrous ethylene diamine, morpholine, anhydrous liquid ammonia, and mixtures thereof.

*Example II*

The detergency effectiveness of the detergents of this invention was determined by washing naturally soiled swatches of desized print cloth for ten minutes in an aqueous solution of the detergent to be evaluated under the following conditions:
 (1) Water temperature—130° F.
 (2) Water hardness—7 gr.
 (3) Detergent concentration—0.02% by weight.
 (4) Sodium tripolyphosphate builder concentration—0.05% by weight.
 (5) Water pH—10.

A miniature machine (the Tergotometer) having normal reciprocating agitation was used. (Tergotometer testing is described in "Detergency Evaluation and Testing," by J. C. Harris, Interscience Publisher, Inc. 1954, p. 60.)

After washing, rinsing and drying, the amount of lipid soil remaining on the swatch was determined by extraction with organic solvent. By comparison with similar determinations of the amount of lipid soil in similarly soiled swatches washed under the same conditions with sodium tallow alkyl sulfate the relative effectiveness of the detergent surfactant can be determined. The results given are in percent by weight of lipid soil removed from the cloth by the organic solvent, either more or less than that amount removed by the organic solvent from cloth cleaned in the sodium tallow alkyl sulfate. Therefore, negative numbers are better than the reference surfactant and positive numbers are worse than the reference surfactant. Sodium tetrapropylene benzene sulfonate, a standard commercial detergent surfactant, is included to show the effectiveness of the compounds of the invention relative to commercial products.

The results of the tests are summarized below:

| Ex. | Detergent surfactant | Test result |
|---|---|---|
| II | 2-ketotridecyl methyl sulfoxide | +18 |
|  | Sodium tetrapropylene benzene sulfonate (reference) | +30 |

The detergent in Example II is a good detergent material.

When in the above example carbonates; pyrophosphates; ethylene diaminetetraacetates; N-(2-hydroxyethyl)-ethylenediamine triacetates; nitrilo triacetates; N-(2-hydroxyethyl)-nitrilodiacetates; phytates; ethane-1-hydroxy-1-diphosphonates; methylenediphosphonates; ethylidene diphosphonates; isopropylidene diphosphonates; benzylmethylidene diphosphonates; chloromethylidene diphosphonates; salts of polymers of itaconic acid, aconitic acid, maleic acid, mesaconic acid, fumaric acid, methylene maleic acid and citraconic acid; salts of copolymers of the above acids with themselves; salts of copolymers of the above acids with ethylene; salts of copolymers of the above acids with themselves and ethylene (the foregoing named polymers and copolymers have molecular weights of at least 350 and equivalent weights of from 50 to 80 based on the acid forms); and mixtures thereof in the form of their sodium, potassium, triethanolammonium, diethanolammonium, and monoethanolammonium salts and mixtures thereof are substituted, either wholly or in part, e.g., a 50% substitution, for the sodium tripolyphosphate builder substantially equivalent results are obtained in that for each builder substitution the detergent agents used in the process of this invention are effective cleaning agents.

*Examples III–XVI*

The following procedure was followed in the preparation of Examples III–XVI except where indicated.

18.0 g. of sodium hydride (0.40 mole, 56% dispersion in mineral oil), was suspended in 500 ml. of dimethyl sulfoxide (dried by distillation at reduced pressure from calcium hydride and storage over 5A Molecular Sieve) and heated with stirring at 60–65° C. for 2½ hours under a slow nitrogen sweep until hydrogen evolution ceased. The solution of the resulting sodium methylsulfinylcarbanion was cooled to 18°–20° and maintained at that temperature by ice-water cooling while 0.20 mole of the indicated ester was dripped in over a period of 20 minutes. The solution was allowed to warm to room temperature, then poured onto crushed ice containing 26 g. (0.5 mole) of ammonium chloride. The aqueous solution was extracted with two 300 ml. portions of chloroform. The chloroform layer was dried with anhydrous magnesium sulfate and evaporated at reduced pressure, with a vacuum pump being required to remove the residual dimethyl sulfoxide. The product was recrystallized from 600 ml. of acetone giving the indicated yields of the indicated products having the indicated melting points.

| Esters | Sulfoxides | Melting Point, °C. | Yields Percent by Weight of Recrystallized Material |
|---|---|---|---|
| n-$C_{17}H_{35}$COO$CH_3$ | n-$C_{17}H_{35}$CO$CH_2$SO$CH_3$ | 97–98 | 67 |
| $CH_3$—⟨⟩—COO$CH_3$ | $CH_3$—⟨⟩—CO$CH_2$SO$CH_3$ | 83–84 | 37 |
| $CH_3$O—⟨⟩—COO$CH_3$ | $CH_3$O—⟨⟩—CO$CH_2$SO$CH_3$ | 102–103 | 52 |
| $CF_3$—⟨⟩—COO$CH_3$ | $CF_3$—⟨⟩—CO$CH_2$SO$CH_3$ | 111–112 | 36 |
| $(CH_3)_2CHCH_2COOCH_3$<br>n-$C_9H_{19}$COO$CH_3$<br>n-$C_{13}H_{19}$COO$C_2H_5$<br>$C_8H_{17}$CH=CH$C_7H_{14}$COO$C_2H_5$ | $(CH_3)_2CHCH_2COCH_2SOCH_3$<br>n-$C_9H_{19}$CO$CH_2$SO$CH_3$<br>n-$C_{13}H_{19}$CO$CH_2$SO$CH_3$<br>$C_8H_{17}$CH=CH$C_7H_{14}$CO$CH_2$SO$CH_3$ | ------<br>75.5–76.5<br>88–89<br>53–54 | 84<br>74<br>[1] 56<br>47 |
| F—⟨⟩—COO$CH_3$ | F—⟨⟩—CO$CH_2$SO$CH_3$ | 92.6–93.2 | [2] 49 |
| $CH_2$=CH$C_8H_{16}$COO$CH_3$<br>$C_{17}H_{35}$COO$CH_3$ | $CH_2$=CH$C_8H_{16}$CO$CH_2$SO$CH_3$<br>$C_{17}H_{35}$CO$CH_2$SO$CH_3$ | 73–74<br>97–98 | 66<br>[2] 70 |
| ⟨⟩—COO$C_2H_5$<br>⟨⟩—OH | ⟨⟩—CO$CH_2$SO$CH_3$<br>⟨⟩—OH | 153.2–153.6 | [2] 24 |
| $C_4H_9$COO$CH_3$ | $C_4H_9$CO$CH_2$SO$CH_3$ | 37–37.5 | [3] 34 |
| ⟨⟩—COO$CH_3$ | ⟨⟩—CO$CH_2$SO$CH_3$ | 86–87 | 45 |

[1] The yield is that of twice recrystallized material.
[2] The yield is that of thrice recrystallized material.
[3] The procedure differs in that enough dried tetrahydrofuran or 1,2-dimethoxyethane was added to depress the freezing point to 0–5° C., at which temperature the ester was added.

What is claimed is:
1. A detergent composition consisting essentially of from about 0.5% to about 50% of a material having the formula

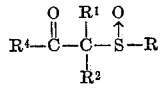

wherein one of the R groups, R, $R^1$, $R^2$, $R^4$ is an alkyl group containing from about 8 to about 20 carbon atoms and the rest of the R groups are either hydrogen atoms or short alkyl chains containing from about 1 to about 3 carbon atoms, and from about 0% to about 90% of water soluble alkaline detergency builder salts, the ratio of builder salts to organic detergent being from about 1:4 to about 20:1.

2. The detergent composition of claim 1 wherein $R^1$ and $R^2$ in the formula are hydrogen atoms, R in the formula is a methyl group and $R^4$ is an alkyl group containing from about 8 to about 20 carbon atoms.

3. The detergent composition of claim 1 wherein there is at least about 20% water soluble alkaline detergency builder salts.

4. The detergent composition of claim 1 wherein the ratio of builder salts to organic detergent is from about 0.7:1 to about 9:1.

5. The detergent composition of claim 1 wherein the detergency builder salts are selected from the group consisting of sodium tripolyphosphate, sodium nitrilotriacetate, and ethane-1-hydroxy-1,1-diphosphonate.

References Cited

UNITED STATES PATENTS 2,327,966  8/1943  Morey _____ 260—593
2,802,033  8/1957  Gregory et al. _____ 260—592

LEON D. ROSDOL, *Primary Examiner.*

S. E. DARDEN, *Assistant Examiner.*